US012646526B1

(12) United States Patent
Sheets

(10) Patent No.: US 12,646,526 B1
(45) Date of Patent: Jun. 2, 2026

(54) ANIMAL CALL COMPARISON TOOL

(71) Applicant: Translator Series Inc., Colorado Springs, CO (US)

(72) Inventor: Eric Sheets, Rockford, OH (US)

(73) Assignee: Translator Series, Inc., Colorado Springs, CO (US)

( * ) Notice: Subject to any disclaimer, the term of this patent is extended or adjusted under 35 U.S.C. 154(b) by 156 days.

(21) Appl. No.: 18/596,915

(22) Filed: Mar. 6, 2024

Related U.S. Application Data

(60) Provisional application No. 63/488,776, filed on Mar. 7, 2023.

(51) Int. Cl.
  *G10L 25/51* (2013.01)
  *G10L 17/26* (2013.01)

(52) U.S. Cl.
  CPC .............. *G10L 25/51* (2013.01); *G10L 17/26* (2013.01)

(58) Field of Classification Search
  CPC ... A01K 29/005; A01K 29/00; A01M 31/004; A41D 13/0012; B29C 66/73921; F16B 1/00; G09B 5/06; G09B 5/065; G09B 23/36; G10K 1/07; G10L 17/26; G10L 25/51; G11B 33/06; H04R 1/021; H04R 3/00; H04S 1/00; E03C 1/04
  USPC ........... 381/56, 386; 434/319; 446/207, 208, 446/397; 700/94; 137/551
  See application file for complete search history.

(56) References Cited

U.S. PATENT DOCUMENTS 2,515,023 A * 7/1950 Thomson ............ A01M 31/004
43/2

4,662,858 A * 5/1987 Hall .................... A01M 31/004
446/397
4,664,641 A * 5/1987 Hearn ................. A01M 31/004
446/397
4,932,920 A * 6/1990 Hearn ................. A01M 31/004
446/421
5,234,369 A * 8/1993 Forbes ............. B29C 66/73921
446/207
5,239,587 A * 8/1993 Muckelrath ............ G11B 33/06
381/124
5,482,078 A * 1/1996 Yeh .......................... E03C 1/04
137/551
5,529,526 A * 6/1996 Wesley ............... A01M 31/004
84/404
5,562,521 A * 10/1996 Butler ................. A01M 31/004
446/397
5,802,197 A * 9/1998 Fulcher .................. H04R 1/021
381/386
6,328,623 B1 * 12/2001 Bean ................... A01M 31/004
446/397

(Continued)

*Primary Examiner* — Gerald Gauthier

(74) *Attorney, Agent, or Firm* — Trenner Law Firm, LLC; Mark Trenner

(57) ABSTRACT

An animal call comparison tool is disclosed as it may be implemented by a computer or processing device. An example tool receives a real-time audible human call mimicking an animal call of a particular animal type. The example tool compares the received real-time audible human call to a prerecorded audio file corresponding to the animal call of the particular animal type. The example tool determines at least one audio quality of the real-time audible human call based on the step of comparing. The example tool generates user feedback for the real-time audible human call, based on the audio quality. The example tool outputs user feedback having at least one metric for improving the real-time audible human call.

20 Claims, 9 Drawing Sheets

(56) References Cited

U.S. PATENT DOCUMENTS

| | | | | |
|---|---|---|---|---|
| 7,133,528 B2 * | 11/2006 | Stilwell | A01M 31/004 | |
| | | | 381/124 | |
| 8,684,787 B1 * | 4/2014 | Burcham | A01M 31/004 | |
| | | | 446/397 | |
| 9,454,918 B1 * | 9/2016 | Hlatky, Jr. | G09B 5/06 | |
| 9,992,993 B1 * | 6/2018 | Greene | G10K 1/07 | |
| 2003/0093169 A1 * | 5/2003 | Gardner | A01M 31/004 | |
| | | | 700/94 | |
| 2004/0220686 A1 * | 11/2004 | Cass | G09B 23/36 | |
| | | | 700/94 | |
| 2007/0222623 A1 * | 9/2007 | Wiliams | A01K 29/00 | |
| | | | 340/573.2 | |
| 2010/0279581 A1 * | 11/2010 | Borhofen | A01M 31/004 | |
| | | | 446/397 | |
| 2011/0082574 A1 * | 4/2011 | Pachet | A01K 29/005 | |
| | | | 700/94 | |
| 2011/0287689 A1 * | 11/2011 | Griffin | A01M 31/004 | |
| | | | 446/193 | |
| 2012/0238180 A1 * | 9/2012 | Fulcher | A01M 31/004 | |
| | | | 446/207 | |
| 2015/0037778 A1 * | 2/2015 | Philp | G09B 5/065 | |
| | | | 434/319 | |
| 2017/0035045 A1 * | 2/2017 | Rouse | A01M 31/004 | |
| 2017/0280704 A1 * | 10/2017 | Foster | A01M 31/004 | |
| 2017/0367320 A1 * | 12/2017 | Allen | A01M 31/004 | |
| 2018/0116204 A1 * | 5/2018 | Gravely | A41D 13/0012 | |
| 2018/0279602 A1 * | 10/2018 | Heegaard | F16B 1/00 | |
| 2018/0279603 A1 * | 10/2018 | Madl | H04R 3/00 | |
| 2019/0261621 A1 * | 8/2019 | Smith | H04S 1/00 | |
| 2019/0357522 A1 * | 11/2019 | Betts | A01M 31/004 | |
| 2022/0378037 A1 * | 12/2022 | Griffeth | A01M 31/004 | |
| 2023/0404061 A1 * | 12/2023 | Phelps | A01M 31/004 | |
| 2024/0065260 A1 * | 2/2024 | Hendrickson | A01M 31/004 | |
| 2024/0081316 A1 * | 3/2024 | Ayer, III | A01M 31/004 | |

* cited by examiner

300

Go Premium

310

CHOOSE YOUR CALL

MENU

320

HOME    DIARY    +    PROGRESS    MORE

350

Go Premium

360

MENU

HONE YOUR CALL

370

BULL
- Raging
- Mating
- Discovery
- Challenge

COW
- Cow call to calf
- Mating esterus
- Discovery "call to lost herd"

CALF
- Discovery "lost from herd"

HOME    DIARY    ⊕    PROGRESS    MORE

700

710 — Receiving audio input from a call

720 — Comparing the audio input to a prerecorded audio file as a reference of a call of a particular animal type 730 — Determining at least one audio quality of the audio input based on comparing the audio input to the prerecorded audio file 740 — Outputting feedback based on the at least one audio quality.

Fig. 8

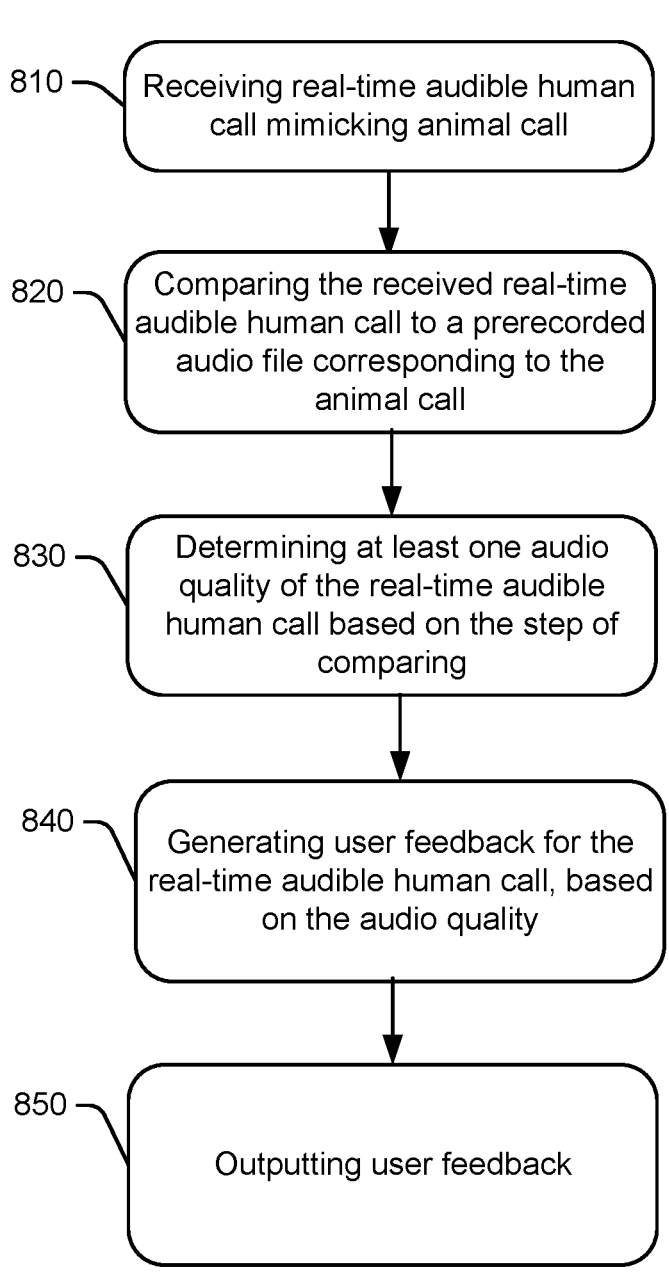

800

810 — Receiving real-time audible human call mimicking animal call

820 — Comparing the received real-time audible human call to a prerecorded audio file corresponding to the animal call 830 — Determining at least one audio quality of the real-time audible human call based on the step of comparing 840 — Generating user feedback for the real-time audible human call, based on the audio quality 850 — Outputting user feedback

ANIMAL CALL COMPARISON TOOL

PRIORITY CLAIM

This application claims the priority filing benefit of U.S. Provisional Patent Application No. 63/488,776 filed Mar. 7, 2023 for "Animal Call Comparison Tool" of Eric Sheets, hereby incorporated by reference in its entirety as though fully set forth herein.

BACKGROUND

Animal calls are used all the time by hunters to attract animals that are being hunted. There are different calls for different animals (e.g., elk, duck, turkey), and even different species (e.g., different species of ducks). There are different calls based on other factors too, such as but not limited to, season (e.g., mating season, early season, late season), time of year (e.g., fall, winter), gender (e.g., for attracting male or female), and region (e.g., Rocky Mountains versus lowland plains). Even different brands of calls claim to be better than others, by more closely mimicking calls of actual wildlife. Hunters may spend considerable time and money choosing the right call.

BRIEF DESCRIPTION OF THE DRAWINGS

FIG. 8 is another flowchart illustrating example operations which may be implemented by an example animal call comparison tool.

DETAILED DESCRIPTION

Figure 1:
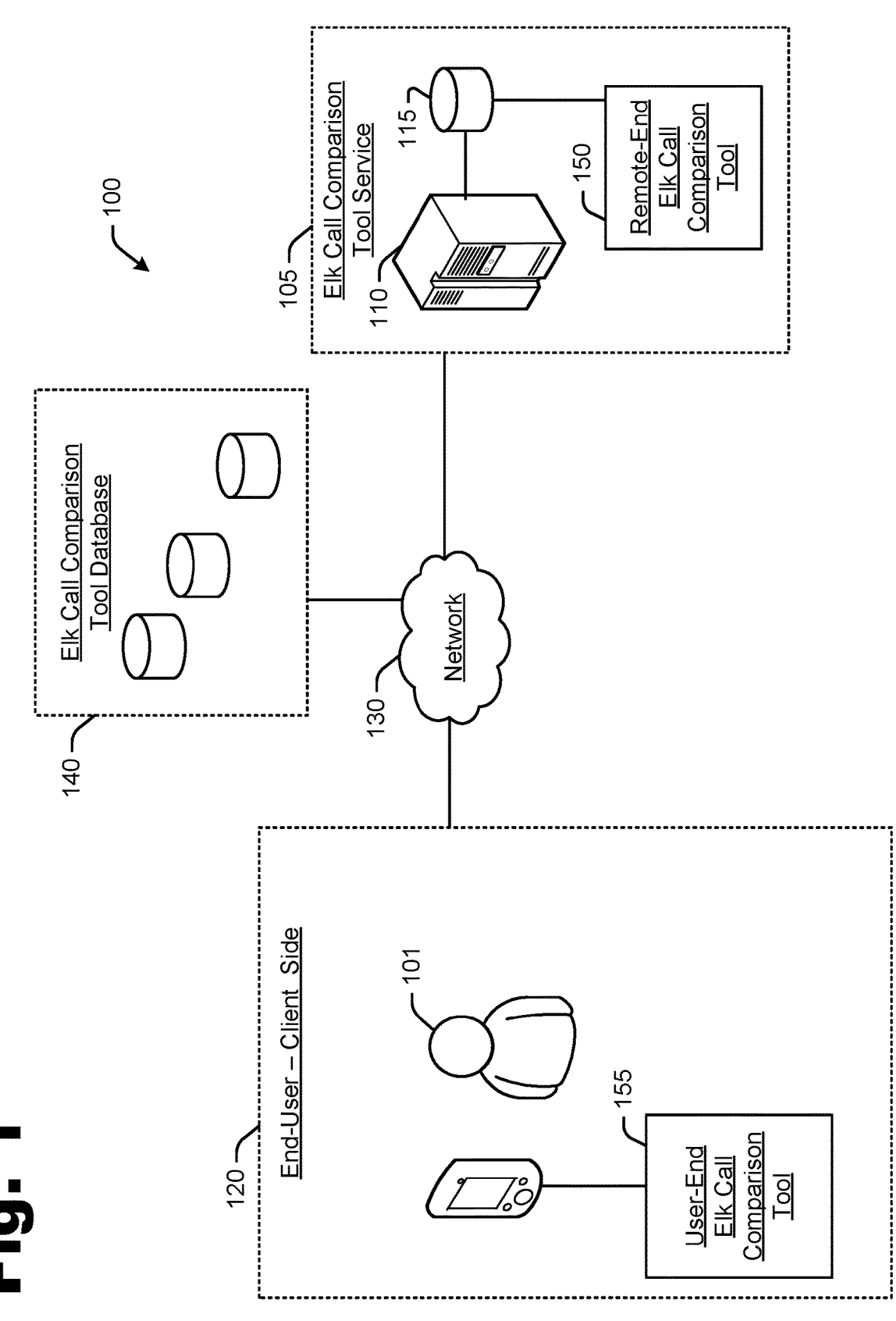
FIG. 1 is a high-level block diagram of an example networked computer system which may implement the animal call comparison tool.

An example animal call comparison tool is disclosed to assist users with selecting and/or using an animal call. In an example, the animal call comparison tool may be implemented at least in part on a mobile device, such as a mobile phone app. However, the animal call comparison tool is not limited to any particular implementation, and may be implemented on stand alone computers, tablets, or any other suitable device now known or later developed.

In an example, a computer program product is embodied as computer-readable instructions stored on a non-transient computer-readable media and executable as an animal call comparison tool. The animal call comparison tool receives from a user via an audio input device, a real-time audible human call mimicking an animal call of a particular animal type. The animal call comparison tool compares by a processing device, the received real-time audible human call to a prerecorded audio file corresponding to the animal call of the particular animal type. The animal call comparison tool determines by a processing device, at least one audio quality of the real-time audible human call based on the step of comparing. The animal call comparison tool generates by a processing device, user feedback for the real-time audible human call, based on the at least one audio quality. The animal call comparison tool outputs via a computer interface, the user feedback. The user feedback has at least one metric for improving the real-time audible human call.

It is noted that animals can hear outside of (above and/or below) the hearing range of humans. As such, mimicking the ideal animal sound requires close attention to finite details of the animal's call, and not just what the human ear can hear. The animal call comparison tool may be implemented, in an example, to provide the user with feedback to help the user match their own call (e.g., pitch, frequency, etc.) to the natural call range of the animal they are trying to mimic.

It is also noted that animal calls may vary for a number of different reasons, beyond animal type. For example, animal calls may vary on the time of day, season, weather patterns, lighting, location in the world, habitat (e.g., prairie versus forest). The animal call comparison tool may implement machine learning to correlate the call to factors such as, but not limited to, air pressure, weather patterns, migration patterns (time of year), movement patterns (time of day), and statistically correlate call recordings based on databases of known parameters (e.g., location, weather, animal habitats and patterns, etc.).

It is further noted that calls may be based on animal communications. Example animal communications include, but are not limited to alarm calls (e.g., a predator is near or approaching), eating calls, movement calls, mating calls. Communication includes both the outgoing call, and the return or reply call (e.g., responding or communicating back). The animal call comparison tool may implement machine learning to correlate the call to communications (e.g., when animal A calls X, animal B replies with Y). These, and/or other factors may also be statistically correlated, such as when animal A calls X, animal B replies with Y 90% of the time. As such, the feedback may help teach the user that when they hear a call, which type of reply call is likely to be authentic to the animal. The feedback may also help teach the user to identify subtle differences and distinguish between calls (e.g., a call that means to the animal "entering the woods" versus another call that means to the animal "eating acorns").

An example method of animal call comparison which may be implemented by the systems and devices described herein may include receiving audio input from a call, and comparing the audio input to a prerecorded audio file as a reference of a call of a particular animal type. The method may also include determining at least one audio quality of the audio input based on comparing the audio input to the prerecorded audio file, and outputting feedback based on the at least one audio quality. It may be helpful to note that an objective is to teach the user what to "say" with the call, and when and how to say it correctly. The device can be said to "translate" between the human voice and that of the animals.

An example of the animal call comparison also includes receiving a call selection by a user. The call selection may be based on at least one of a type of call, and a brand or manufacturer of call.

An example of the animal call comparison also includes receiving an animal quality selection by a user. The animal quality selection may be at least one of animal type, animal gender, animal location, and animal characteristic (e.g., mating or cow-to-cow).

An example of the animal call comparison also includes displaying a sound graph of the audio input adjacent to a sound graph of the prerecorded audio file for visual comparison. The audio input may be a live sound recording of the user operating the call. Visual output may also include displaying a "live meter" showing the audio file as the user is making the call. The audio quality may be at least one of tune, pitch, length, and volume of output of the call. In an example, the user may receive a "grade" for their use of the call. For example, a good grade may be awarded when the user's call mostly closely approximates (e.g., within 2%) that of the prerecorded audio file. Grading may be by machine or by a pro caller.

An example of the animal call comparison also includes displaying a video help file and/or "pro" tips (where a pro can be another user or professional) for improving use of the call. Indeed, any user can apply to be a "pro," for example, based on their own ability to mimic actual animal calls with their own calls.

The prerecorded audio file may be a sound recording of an actual animal call. The sound recording of the actual animal call may be submitted by a user. For example, the sound recording of the actual animal call may be recorded of the animal making the call in nature. The sound recording of the actual animal call may also be recorded in a studio.

The sound recording of the actual animal call may be recorded according to at least one parameter. Examples of parameters include, but are not limited to at least one of location, altitude, time of year, time of day, weather, temperature, and season (e.g., mating season, calving season).

An example of the animal call comparison also includes rewarding the user for submitting the sound recording. Rewards may be point-based, monetary, coupons, or physical rewards (e.g., shipped to the user). Rewards may help to encourage user participation, increase the library of available audio, and engagement with other users. In an example, the method may also include engaging the user on social media.

In an example, the prerecorded audio file is a sound recording of another user of the call. The prerecorded audio file may be a sound recording of other hunters and/or professional caller(s) using the call.

In an example, the prerecorded audio file is a depiction of an audio file generated by machine learning for comparing the users' call.

In an example, processing may include analyzing the audio of varying calls or call types using machine learning to analyze and construct from learning how to create a comparable file against the user input.

It is an objective to train a machine (e.g., using machine learning) how to recognize various animal calls and to identify the region, season, and intention behind what the animal is "saying." The calls can be "translated" into understandable metrics that can be used for understanding animal calls in the wild. There is a demand among call app developers for such a technology to exist to support their own call applications.

In an example, application developers may wish to license the platform to create their own animal calls applications. These flagship applications can run on the underlying platform disclosed herein. Hunters, gamers, photographers and wild animal enthusiasts are the overall market which can be served directly and behind the scenes as other application developers and entrepreneurs are also supported.

It is noted that the market for developers seeking to have a platform that can learn to speak the language of an animal includes over 6.5 million people and businesses seeking machine learning that covers real animal linguistics. Further, if including the average gamer (video games), the market then reaches billions of users. Gaming and the "fun aspect" that the app offers is a major share of the value of the app and supporting apps that run on this core platform.

Although the animal call comparison tool is illustrated herein with regard to calls that may be used in hunting, the animal call comparison tool is not limited to hunting calls. Other calls used for other purposes (e.g., animal tracking for research and conservation, bird watching, etc.) may also be used with the animal call comparison tool disclosed herein.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

FIG. 1 is a high-level block diagram of an example networked computer system which may implement the animal call comparison tool. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. In an example, the animal call comparison tool is implemented as a mobile or smartphone application or "app" 155.

Each of the computing devices for implementing the animal call comparison tool may include memory, storage, and a degree of data processing capability at least sufficient to manage a communications connection either directly with one another or indirectly (e.g., via a network). At least one of the computing devices is also configured with sufficient processing capability to execute the program code described herein for implementing the features of the animal call comparison tool.

In an example, the system 100 may include a host platform 110 or "host" providing an animal call comparison tool service 105. The service 105 may be accessed by a user 101 via an end-user client-side device 120 or "client" for short (e.g., the user's mobile phone executing the animal call comparison tool app 155). For purposes of illustration, the animal call comparison tool service platform 105 or "service" may be an online data processing service executing on a host 110 configured as a server computer with computer-readable storage 112, e.g., for hosting an online or software as a service (SAAS) platform and or performing more complex computing tasks than could efficiently be accomplished on a mobile device, such as, but not limited to, executing machine learning algorithms for cataloging animal call audio files.

Example services provided for the animal call comparison tool may include general purpose computing services (e.g., access to data sets and/or audio and/or video recordings hosted on the Internet or as dynamic data endpoints for any number of client applications). Services also include interfaces to application programming interfaces (APIs) executable by the animal call comparison tool and related support infrastructure, including but not limited to online advertising, sponsors, and social media services.

The client 120 may be any suitable computer or computing device 120 capable of accessing the host 110. As already noted, the client 120 may be the user's mobile phone executing the animal call comparison tool application code 155 or "app" on the user's mobile phone. Host 110 and client 120 are not limited to any particular type of devices. Although, it is noted that the operations described herein for the animal call comparison tool may be executed by program code 150 residing on the client 120 on one or more network 130.

The system 100 for implementing the animal call comparison tool may also include a communication network 130, such as a local area network (LAN) and/or wide area network (WAN). In one example, the network 130 includes the Internet or other mobile communications network (e.g., a 3G, 4G or 5G or next generation mobile device network). Network 130 may also provide greater accessibility to the animal call comparison tool for use in distributed environments, for example, where more than one user may have input and/or receive output from the service 105.

The host 110 and client 120 may be provided on the network 130 via a communication connection, such as via an Internet service provider (ISP). In this regard, the client 120 is able to access features of the animal call comparison tool directly via the network 130, or via an agent, such as another network.

In an example, the remote-end elk call comparison tool 150 or program code for executing the animal call comparison tool has access to both the client 120 and the service 105 in the networked computer system 100. For example, the service 105 may be a cloud-based service, wherein the program code is executed on at least one computing device local to the client 120, but having access to the service 105 in the cloud computing system.

Before continuing, it is noted that the computing devices are not limited in function. The computing devices may also provide other services of the animal call comparison tool in the system 100. For example, host 110 may also provide transaction processing services and social media services for the client 120.

In addition, the animal call comparison tool may include at least one remote source 115 of content, and/or the service 105 may be operable to communicate one or more elk call comparison tool database 140 or remote source of content. Content may include, but is not limited to, user provided audio, professional audio, stock or generic audio, as well as videos (e.g., instructional videos for improving use of a call). The source may be part of the animal call comparison tool, and/or the source may be physically distributed in the network and operatively associated with the service 105. In any implementation, the source may include any content. For example, the source 140 may include databases for machine learning, providing information, applications for providing application data, storage resources for providing online storage facilities. There is no limit to the type or amount of content that may be provided by the source. In addition, the content may include unprocessed or "raw" data, or the content may undergo at least some level of processing.

As mentioned above, the program code 150 may be executed for the animal call comparison tool by any suitable computing device to identify call patterns. In addition, the program code may serve one or more than one client 120.

Figure 2:
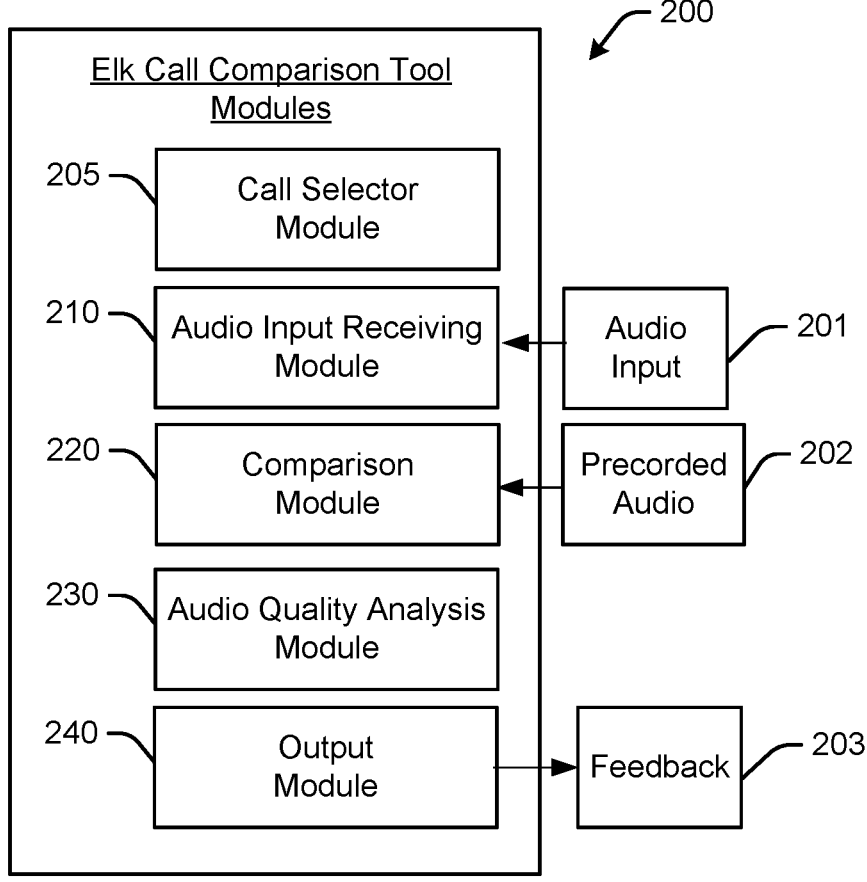
FIG. 2 shows an example architecture of machine readable instructions, which may be executed by the animal call comparison tool.

Program code used to implement features of the animal call comparison tool can be better understood with reference to FIG. 2 and the following discussion of various example functions. However, the operations described herein for the animal call comparison tool are not limited to any specific implementation with any particular type of program code.

FIG. 2 shows an example architecture of machine readable instructions, which may be executed by the animal call comparison tool. In an example, the program code discussed above with reference to FIG. 1 may be implemented in machine-readable instructions (such as but not limited to, software or firmware). The machine-readable instructions may be stored on a non-transient computer readable medium and are executable by one or more processor to perform the operations described herein. It is noted, however, that the components shown in FIG. 2 are provided only for purposes of illustration of an example operating environment, and are not intended to limit implementation to any particular system or device.

The program code executes the function of the architecture of machine readable instructions 200 as self-contained modules of the animal call comparison tool. These modules can be integrated within a self-standing tool or app, or may be implemented as agents that run on top of an existing program code.

In an example, the architecture of machine readable instructions 200 for the animal call comparison tool may include a call selector module 205 for receiving a call selection from a user (e.g., based on manufacturer/model and/or any other selection parameters).

In an example, the architecture of machine readable instructions 200 for the animal call comparison tool may include a call selector module 210 for receiving audio input from a call.

In an example, the architecture of machine readable instructions 200 for the animal call comparison tool may include a call comparison module 220 for comparing the audio input 201 to a prerecorded audio file 202 as a reference of a call of a particular animal type.

In an example, the architecture of machine readable instructions 200 for the animal call comparison tool may include an audio quality analysis module 230 for determining audio quality of the audio input based on comparing the audio input 201 to the prerecorded audio file 202.

In an example, the architecture of machine readable instructions 200 for the animal call comparison tool may include an output module 240 for outputting feedback 203 based on the audio quality.

Before continuing, it should be noted that the examples described above are provided for purposes of illustration, and are not intended to be limiting. Other devices and/or device configurations may be utilized to carry out the operations described herein.

Figure 3A:
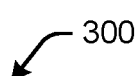
FIGS. 3A-3B and 4 are screen images of a mobile device illustrating example interface input of the animal call comparison tool.
Figure 3B:
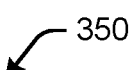
Figure 4:
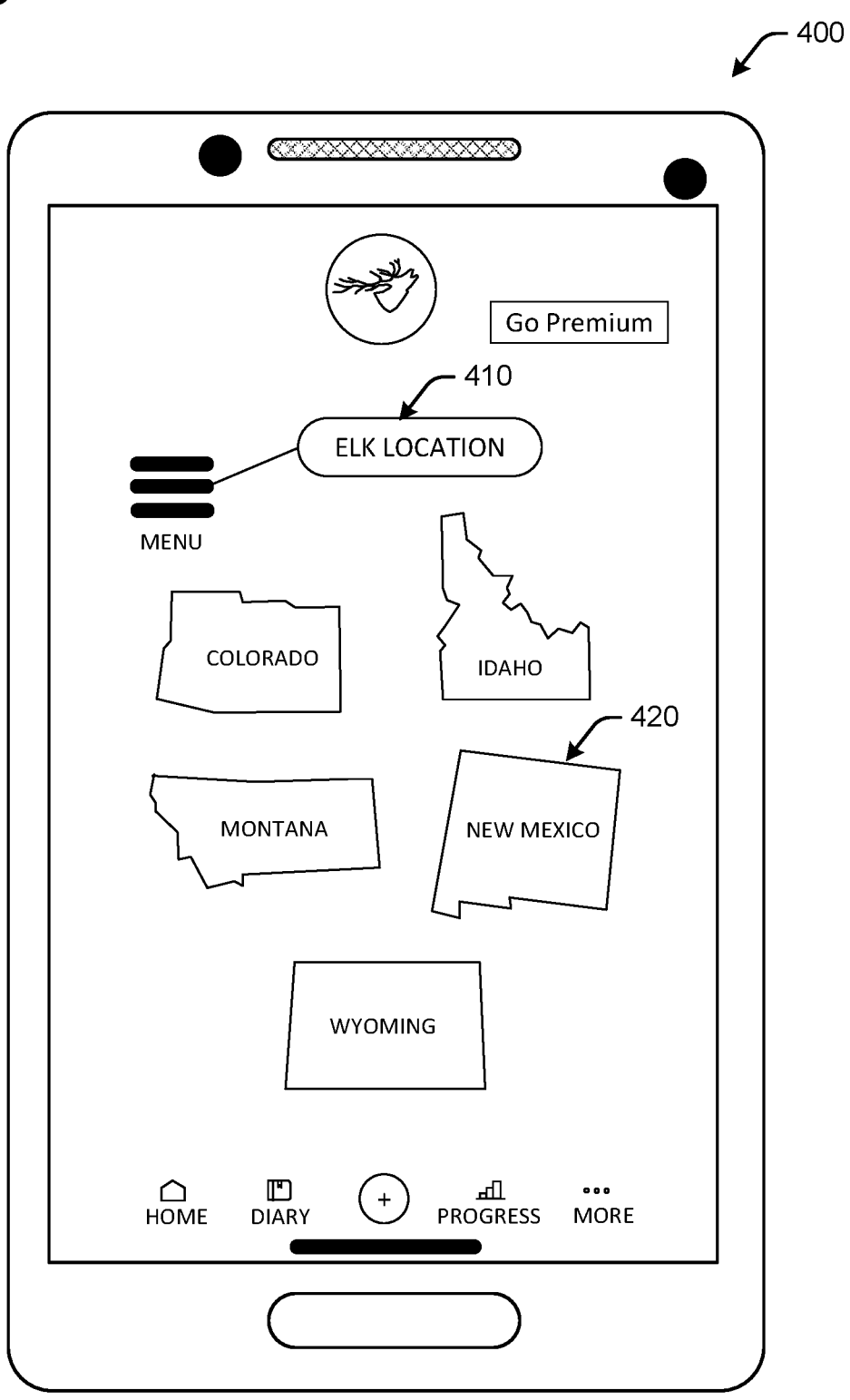
Figure 5:
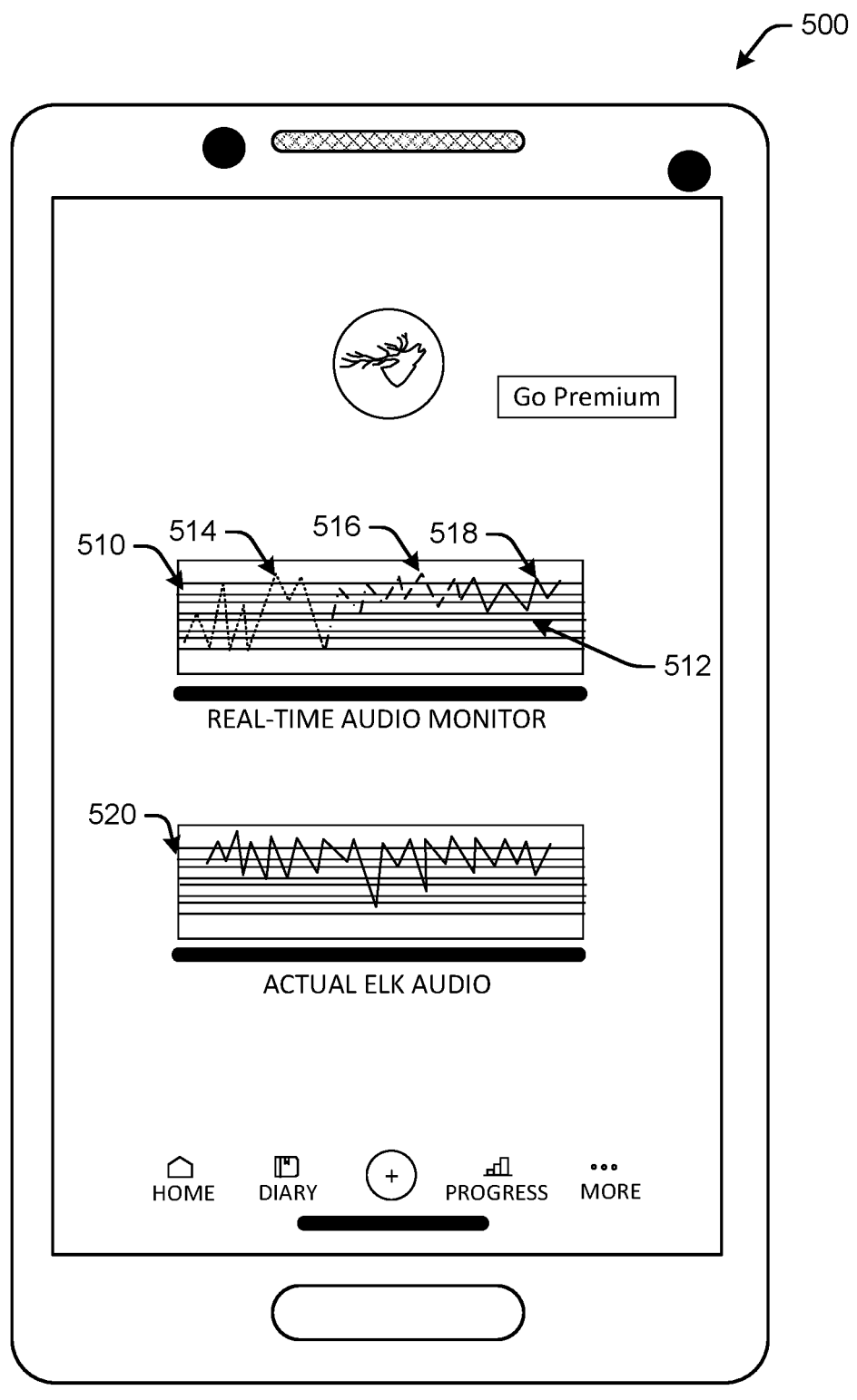
FIGS. 5-6 are screen images of a mobile device illustrating example interface output of the animal call comparison tool.
Figure 6:
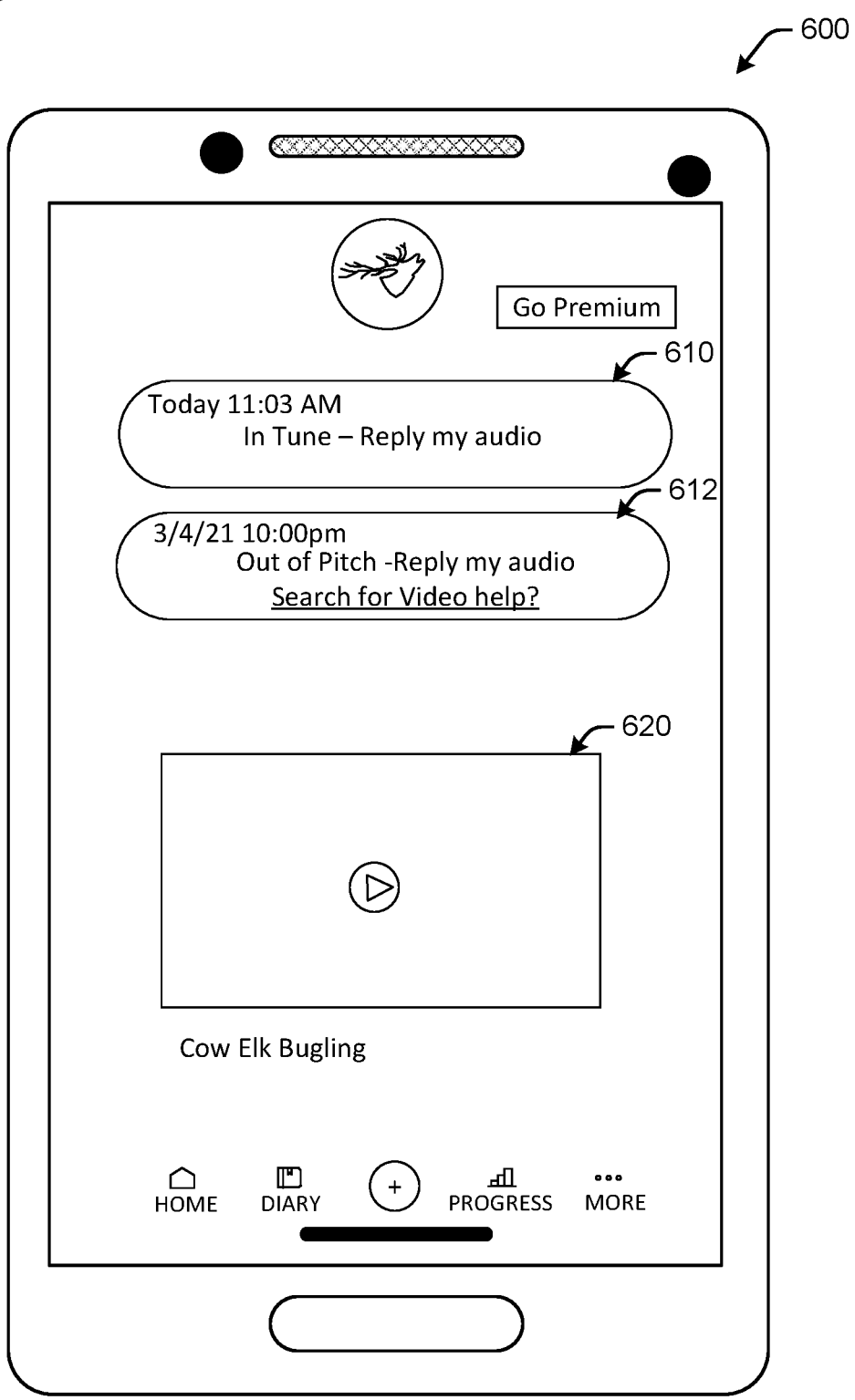

FIGS. 3A-3B and 4 are screen images of a mobile device illustrating example interface input of the animal call comparison tool. FIGS. 5-6 are screen images of a mobile device illustrating example interface output of the animal call comparison tool. The operations for the animal call comparison tool may be implemented at least in part using an end-user interface (e.g., web-based interface or "app"). In an example, the end-user is able to make predetermined selections, and the operations described above are implemented on a back-end device to present results to a user (e.g., via the app on the mobile device). The user can then make further selections via the app. It is also noted that various of the operations described herein may be automated or partially automated.

FIG. 3A shows an example display interface 300 via the app on a user's phone for displaying a menu of options 310 and receiving a call selection 320 by a user (e.g., by tapping on the screen). The call selection 320 may be based on at least one of a type of call, and a brand or manufacturer of call.

FIG. 3B shows an example display interface 350 via the app on a user's phone for displaying a menu of options 360 and receiving a selected animal type or quality 370. The animal type or quality selection 370 may be at least one of animal type, animal gender, animal location or territory, and animal characteristic (e.g., mating or cow-to-cow).

FIG. 4 shows an example display interface 400 via the app on a user's phone for displaying a menu of options 410 and receiving a selected sound recording parameter of the actual animal call recorded according to at least one parameter. Examples of parameters include, but are not limited to at least one of location, altitude, time of year, time of day, weather, temperature, and season (e.g., mating season, calving season). In FIG. 4, the user interface is shown displaying various location parameters 420 by state from which the user may make a selection.

FIG. 5 shows example display interface 500 via the app on a user's phone for displaying a first sound graph 510 of the audio input adjacent to a second sound graph 520 of the prerecorded audio file, e.g., arranged for visual comparison. In an example, the audio input is a live or real-time sound recording of the user operating the call. This enables the user to watch the sound graph 510 and adjust, in real-time, the call to more closely match the sounds graph 520. By way of illustration, the sound graph 510 may show a visual graphic (e.g., lines or waveform) 512 that guides the user. For example, the waveform 512 is shown using a first (broken) line pattern 514 (or may be shown in red) for poor correspondence with the sound graph 520, a second (broken) line pattern 516 (or may be shown in yellow) for medium correspondence with the sound graph 520, and a third (solid) line pattern 518 (or may be shown in green) for good correspondence with the sound graph 520. In an example, the audio quality comparison may be based on at least one of tune, pitch, length, and volume of output of the call.

In an example, the prerecorded audio file is a sound recording of an actual animal call. For example, the sound recording of the actual animal call may be submitted by a user. Or for example, the sound recording of the actual animal call may be recorded in nature. In another example, the sound recording of the actual animal call may be recorded in a studio. The sound recording of the actual animal call is recorded according to at least one parameter, including at least one of location, altitude, time of year, time of day, weather, temperature, and season (e.g., mating season, calving season). The prerecorded audio file may be a sound recording of another user of the call. The prerecorded audio file may be a sound recording of a professional caller using the call.

FIG. 6 shows example display interface 600 via the app on a user's phone. In this example, output includes, but is not limited to, displaying a link to a first user recording 610 that was "in-tune" or had good correspondence with the actual animal call. Another link may be to a second user recording 612 that was "out of tune" or had poor correspondence with the actual animal call. A video help file 620 may also be provided for the user with tips to aid in improving the user's calling technique (e.g., to more closely match the actual animal call).

Examples of output which may be generated by the comparison tool are discussed in more detail below.

Call ratings. The app may rate both individual calls and conversational calls. Call ratings are displayed (shareable to other mediums including but not limited to social media or in-game display) by individual call (phrase or word) or conversational calls using call and response. Both call types can be used for gaming and call training.

The platform itself uses machine learning to learn any new animal language and translate that language to any other language. The platform can translate animal calls into english (or any spoken language) by word or phrase. In the case where one animal species is speaking to another species, our conversational call feature set will predict what animal is saying to another animal or mammal.

Scoring/Competition. The user may compete by (A) individual calls or by (B) conversational calls. The platform predicts what the call is and recommends best responses for the caller to call (e.g., to best replicate a real "conversation" between animals). In an example, the platform keeps two score types, (1) individual calls and/or (2) conversational calls.

Game Map. In an example, the platform may generate a game map. By way of illustration, there is the initial call (e.g., this is what they said . . . what it means), and the app recommends how to respond (e.g., what to say or not say). The platform scores each call and issues badges, xp, rank, and/or title (e.g., bronze, silver, gold leagues and badges). Scores may be issued on a per animal basis.

In an example, skill matching is used to rate players and match close ranking players to compete with each other.

In an example, users can vote for each call, each player, each call manufacturer.

In an example, wherein the app is a Virtual Reality (e.g., Oculus) application, the user is hunting and can make the calls. The platform then predicts where the animal should come from, and the player aims and "shoots" in the game.

Pro Guide Tips. In an example, the platform finds common errors in users' calls and offers written, audio and/or video tips to address that specific problem with suggested technique tips as a possible solution.

In an example, the Pro Guide Tips system maintains a log of what tips and tricks are most effective based on the users' improved (or not) performance.

If common errors keep occurring even after being offered specific tips and tricks, on the back end, administrators are notified that improved tips and tricks might need to be added to offer users more effective tips and tricks for that specific common error.

In an example, users have the ability to "Skip" tips. Tips may attempt to play by default or "Next Tip" or "Play Pro Call" (to hear our professional calls).

User Profiles. In an example, the users each have their own profile that tracks their calls, scores, badges, xp, shows progress, league, etc.

Storefront. In an example, users can buy animal calls directly from the app.

Figure 7:
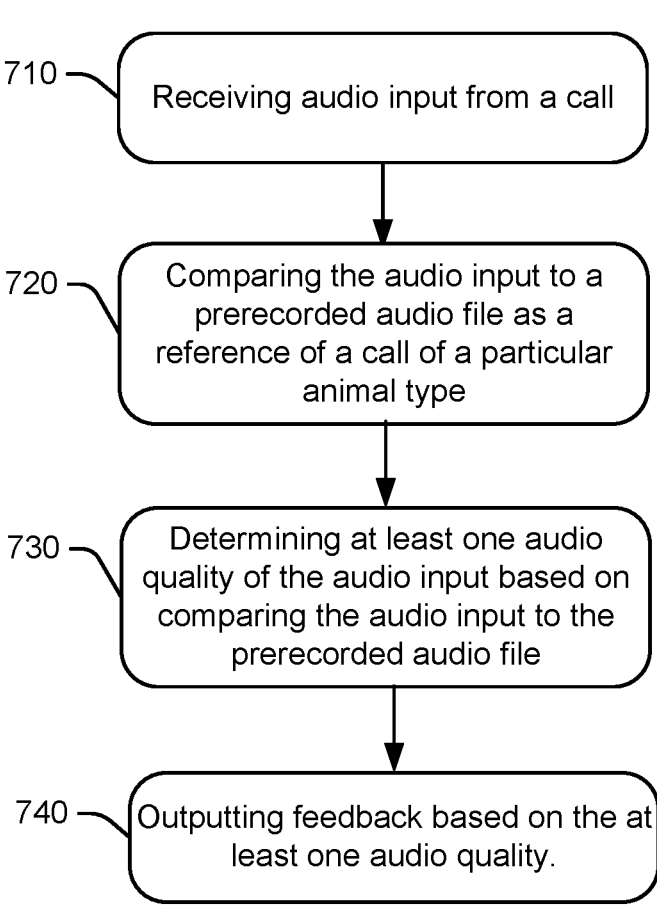
FIG. 7 is a flowchart illustrating example operations which may be implemented by the animal call comparison tool.

FIG. 7 is a flowchart illustrating example operations which may be implemented by an example animal call comparison tool. Operations 700 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Operation 710 of an example of animal call comparison includes receiving audio input from a call. Operation 720 includes comparing the audio input to a prerecorded audio file as a reference of a call of a particular animal type. Comparing may be by a suitable sound analysis tool, such as a commercial tool provided by Amazon Web Services (AWS) and/or proprietary tools. The sound analysis may be improved over time utilizing machine learning (e.g., to find better audio files or those that more closely represent actual animal sounds). Operation 730 includes determining at least one audio quality of the audio input based on comparing the audio input to the prerecorded audio file. Operation 740 includes outputting feedback based on the at least one audio quality.

The operations shown and described herein are provided to illustrate example implementations of the animal call comparison tool. It is noted that the operations are not limited to the ordering shown. Still other operations may also be implemented for the animal call comparison tool.

Still further example operations may include receiving a call selection by a user. The call selection may be based on at least one of a type of call, and a brand or manufacturer of call. Another example operation may include receiving an animal quality selection by a user. The animal quality selection may be at least one of animal type, animal gender, animal location, and animal characteristic (e.g., mating or cow-to-cow).

Still further operations may include displaying a sound graph of the audio input adjacent to a sound graph of the prerecorded audio file for visual comparison. In an example, the audio input is a live sound recording of the user operating the call. In another example, the audio quality is at least one of tune, pitch, length, and volume of output of the call.

Still further operations may include displaying a video help file for improving use of the call. Another example operation may include engaging the user with other user(s) and/or social media.

Still further operations may include rewarding the user for submitting the sound recording (e.g., by royalty payment).

Another example operation may include engaging the user with other user(s) and/or social media.

FIG. 8 is another flowchart illustrating example operations which may be implemented by an example animal call comparison tool. Operations 800 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

Operation 810 of an example of animal call comparison includes receiving (e.g., from a user via an audio input device) a real-time audible human call mimicking an animal call of a particular animal type (e.g., an elk). The user may record this call using their voice or an animal call device. The recording is compared to the call of an actual animal (e.g., the elk). The actual animal call may be prerecorded. The user may record and then submit the recording, or record on an ongoing basis for comparison (and monitor for correction) in real-time.

Operation 820 of an example of animal call comparison includes comparing (e.g., by a processing device) the received real-time audible human call to a prerecorded audio file corresponding to the animal call of the particular animal type. As noted above, this comparison may be on an ongoing basis for comparison in real-time. The comparison may be according to any suitable comparison (e.g., waveform) algorithm which executes to compare sound quality, tone, frequency, etc. of the human call to the animal call.

Operation 830 of an example of animal call comparison includes determining (e.g., by a processing device) at least one audio quality of the real-time audible human call based on the step of comparing. The comparison may be multifaceted, including comparison of multiple different parameters at the same time and/or as part of the same analysis. In an example, comparing further includes evaluating audio signals at frequencies outside of hearing range of humans but within hearing range of the particular animal type. Although the user (a person) may not be able to discern the differences in the calls outside of hearing range, the user can indeed see the differences when presented in waveform or other graphical presentation via the user interface.

In an example, comparing further includes the step of evaluating audio signals based at least on user call skill level ranging from beginner to advanced. By way of illustration, a beginner user may simply desire to get the correct type of call (e.g., a corresponding reply call) and/or practice the call until it is nearer to the actual animal call. Whereas, an experienced user may desire full accuracy or at least accuracy that is barely discernible to the animal being called. Accuracy may be improved, for example, by taking other parameters into account, such as time of day, mating season, male versus female, etc. Any range between beginner and advanced user may also be implemented.

In an example, comparing further includes evaluating audio signals based at least on distance to an animal of interest. In an example, comparing further includes evaluating audio signals based at least on environmental conditions between a human caller and an animal of interest.

Operation 840 of an example of animal call comparison includes generating (e.g., by a processing device) user feedback for the real-time audible human call, based on the audio quality. The feedback may include guides or instructional material, comparisons to actual animals, before/after comparisons of the user's own data, comparisons to other users, links to professionals that can help, improvement history, practice logs, etc. The feedback may be presented in any suitable format, such as visual (e.g., graphical, textual) output, audible output, links to Internet articles and/or videos.

Operation 850 of an example of animal call comparison includes outputting (e.g., via a computer interface such as a mobile device) the user feedback. The user feedback can have at least one metric for improving the real-time audible human call. Metrics may include pitch, frequency, tone, volume, duration, to name only a few examples. Any suitable metric may be provided which may aid the user in improving the quality of their call as it compares to the actual animal call. In an example, metrics for improving the real-time audible human call correspond to an audio quality of at least one of tune, pitch, length, and volume of output of the real-time audible human call relative to the mimicked animal call of the particular animal type.

In another example, outputting may further include displaying (e.g., on a display device) a first visual sound graph of the received real-time audible human call adjacent to a second visual sound graph of the prerecorded audio file corresponding to the animal call of the particular animal type for visual comparison by the user.

Still other example operations may include receiving a call selection by a user (e.g., via the mobile device interface). The call selection can be based on at least one of a type of call, and a brand or manufacturer of call, wherein the step of comparing is specific to the call selection.

In another example, further operations may include receiving an animal quality selection by a user (e.g., via the mobile device interface). The animal quality selection is at least one of animal type, animal gender, animal location, and animal characteristic, wherein the step of comparing is specific to the call selection.

In another example, the prerecorded audio file corresponding to the animal call of the particular animal type is a sound recording recorded according to at least one parameter, including at least one of animal location, animal altitude, time of year, time of day, weather, temperature, and animal life-cycle season.

In another example, the sound recording is at least one of an animal, a recording of another user, a professional caller.

In another example, operations may include analyzing (e.g., by an algorithm such as machine learning) a plurality of prerecorded calls to construct a comparable audio recording file for comparing against the real-time audible human call mimicking an animal call of the particular animal type.

In another example, operations may include constructing (e.g., by machine learning) the prerecorded audio file corresponding to the animal call of the particular animal type based on a plurality of prerecorded calls to construct a comparable audio recording file for comparing against the real-time audible human call mimicking an animal call of the particular animal type. A catalog of audio files may be constructed by the machine learning algorithm. The catalog of audio files may have comparable audio recording files correlating to a plurality of call parameters. The call parameters can include, but are not limited to, animal types, weather conditions, locations, times, animal migration patterns, animal movement patterns, and animal habitats.

In another example, operations may include building (e.g., by machine learning) training output for the user based on a type of animal call. The type of animal call may include at least one of alarm calls, eating calls, movement calls.

In another example, operations may include building communication files (e.g., by machine learning) the communication files. The communications files may include a first audible call and a second audible call responding to the first audible call. In an example, the first and second calls may be for training a user to communicate with the particular animal type. In an example, the first and second calls may be for training a user to distinguish between communication calls of the particular animal type.

It is noted that the examples shown and described are provided for purposes of illustration and are not intended to be limiting. Still other examples are also contemplated.

The invention claimed is:

1. A computer program product embodied as computer-readable instructions stored on a non-transient computer-readable media and executable as an animal call comparison tool to implement steps comprising:
   building communication files by machine learning, the communication files including a first audible call and a second audible call responding to the first audible call;
   receiving from a user via an audio input device, a real-time audible human call mimicking an animal call of a particular animal type;
   comparing by a processing device, the received real-time audible human call to a prerecorded audio file corresponding to the animal call of the particular animal type;
   determining by a processing device, at least one audio quality of the real-time audible human call based on the step of comparing;
   generating by a processing device, user feedback for the real-time audible human call, based on the at least one audio quality; and
   outputting via a computer interface, the user feedback, the user feedback having at least one metric for improving the real-time audible human call.

2. The animal call comparison tool of claim 1, further comprising receiving a call selection by a user, the call selection is based on at least one of a type of call, and a brand or manufacturer of call, wherein the step of comparing is specific to the call selection.

3. The animal call comparison tool of claim 1, further comprising receiving an animal quality selection by a user, the animal quality selection is at least one of animal type, animal gender, animal location, and animal characteristic, wherein the step of comparing is specific to the call selection.

4. The animal call comparison tool of claim 1, wherein the step of outputting further comprises displaying on a display device, a first visual sound graph of the received real-time audible human call adjacent to a second visual sound graph of the prerecorded audio file corresponding to the animal call of the particular animal type for visual comparison by the user.

5. The animal call comparison tool of claim 1, wherein the at least one metric for improving the real-time audible human call corresponds to an audio quality of at least one of tune, pitch, length, and volume of output of the real-time audible human call relative to the mimicked animal call of the particular animal type.

6. The animal call comparison tool of claim 1, wherein the prerecorded audio file corresponding to the animal call of the particular animal type is a sound recording recorded according to at least one parameter, including at least one of animal location, animal altitude, time of year, time of day, weather, temperature, and animal life-cycle season.

7. The animal call comparison tool of claim 1, wherein the sound recording is at least one of an animal, a recording of another user, a professional caller.

8. The animal call comparison tool of claim 1, further comprising analyzing by machine learning, a plurality of prerecorded calls to construct a comparable audio recording file for comparing against the real-time audible human call mimicking an animal call of the particular animal type.

9. The animal call comparison tool of claim 1, further comprising constructing by machine learning, the prerecorded audio file corresponding to the animal call of the particular animal type based on a plurality of prerecorded calls to construct a comparable audio recording file for comparing against the real-time audible human call mimicking an animal call of the particular animal type.

10. The animal call comparison tool of claim 9, further comprising a catalog of audio files constructed by the machine learning, the catalog of audio files having comparable audio recording files correlating to a plurality of call parameters.

11. The animal call comparison tool of claim 10, wherein the call parameters include animal types, weather conditions, locations, times, animal migration patterns, animal movement patterns, and animal habitats.

12. The animal call comparison tool of claim 1, wherein the step of comparing further comprises evaluating audio signals at frequencies outside of hearing range of humans but within hearing range of the particular animal type.

13. The animal call comparison tool of claim 1, wherein the step of comparing further comprises evaluating audio signals based at least on user call skill level ranging from beginner to advanced.

14. The animal call comparison tool of claim 1, wherein the step of comparing further comprises evaluating audio signals based at least on distance to an animal of interest.

15. The animal call comparison tool of claim 1, wherein the step of comparing further comprises evaluating audio signals based at least on environmental conditions between a human caller and an animal of interest.

16. The animal call comparison tool of claim 1, further comprising building by machine learning, training output for the user based on a type of animal call.

17. The animal call comparison tool of claim 16, wherein the type of animal call comprises at least one of alarm calls, eating calls, movement calls.

18. The animal call comparison tool of claim 1, wherein the first and second calls are for training a user to communicate with the particular animal type.

19. The animal call comparison tool of claim 18, wherein the first and second calls are for training a user to distinguish between communication calls of the particular animal type.

20. A computer program product embodied as computer-readable instructions stored on a non-transient computer-readable media and executable as an animal call comparison tool to implement steps comprising:

receiving from a user via an audio input device, a real-time audible human call mimicking an animal call of a particular animal type;

comparing by a processing device, the received real-time audible human call to a prerecorded audio file corresponding to the animal call of the particular animal type;

wherein the step of comparing further comprises evaluating audio signals at frequencies outside of hearing range of humans but within hearing range of the particular animal type;

determining by a processing device, at least one audio quality of the real-time audible human call based on the step of comparing;

generating by a processing device, user feedback for the real-time audible human call, based on the at least one audio quality, and outputting via a computer interface, the user feedback, the user feedback having at least one metric for improving the real-time audible human call.

\* \* \* \* \*